Patented Jan. 16, 1940

2,187,570

UNITED STATES PATENT OFFICE 2,187,570

POLYVINYL ACETALS

Georg Kränzlein and Ulrich Lampert, Frankfort-on-the-Main-Höchst, Germany, assignors to I. G. Farbenindustrie Aktiengesellschaft, Frankfort-on-the-Main, Germany No Drawing. Application December 16, 1938, Serial No. 246,075. In Germany December 22, 1937

5 Claims. (Cl. 260—73)

The present invention relates to polymeric compounds.

We have found that new polymerization products containing carboxyl and of high molecular weight can be obtained by causing already formed polymeric compounds containing hydroxyl, particularly polyvinyl alcohol and the derivatives thereof, as far as they still contain free hydroxyl groups, to react, by a condensation process, with carboxylic acids which contain a reactive carbonyl group besides a carboxyl group. A great variety of carboxylic acids of this kind is known so that to the advantage of the high degree of polymerization there may be added the advantage of the formation of a great variety of polymeric compounds. For instance by the reaction of polyvinyl alcohol with aldehyde carboxylic acids containing halogen-, nitro-, hydroxy- or amino- groups, the corresponding polymeric carboxylic acids containing halogen-, nitro-, hydroxy- or amino-groups may be made. These acids are in many ways of industrial interest.

As derivatives of polyvinyl alcohol still containing free hydroxyl groups there may be used, for instance, partially saponified esters of polyvinyl alcohol with organic acids, such as polyvinyl acetate; formate, propionate, butyrate; furthermore polyvinyl alcohol wherein part of the hydroxyl groups has been caused to react with an aldehyde or a ketone; for instance acetals of polyvinyl alcohol with formaldehyde, acetaldehyde, butyraldehyde, isobutyraldehyde, cyclohexanone or methylcyclohexanone, said acetals still containing hydroxyl groups.

Aliphatic as well as aromatic oxo-carboxylic acids may be used for the reaction. A valuable aromatic reactive carboxyl compound containing carbonyl is the aldehyde-cresotinic acid

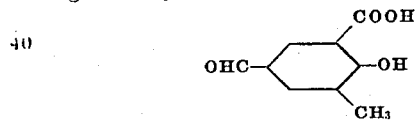

The finished acetal from this compound is capable of forming chromium complexes.

Other suitable acids are glyoxylic acid, levulinic acid, aceton-dicarboxylic acid, ortho-, meta- and para-benzaldehyde-carboxylic acid, the salicylaldehyde-carboxylic acids, terephthalaldehyde-carboxylic acid, 3.4-dimethoxy-benzaldehyde-carboxylic acid (opianic acid), 4-chloro-benzophenone-2'-carboxylic acid, 3-nitro-benzophenone-2'-carboxylic acid, 3-amino-benzophenone-2'-carboxylic acid and cyclohexanone-1-carboxylic acid-3.

Furthermore it is not necessary to start from polymeric compounds containing hydroxyl groups, since polymerides may be used which are saponifiable with formation of free hydroxyl groups. It is likewise unnecessary that the carbonyl group should be present in the free condition. In this case, too, the saponifiable form suffices; thus, for instance, an acetal of glyoxylic acid of the formula

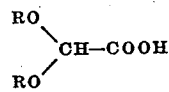

may be used. The reaction must, however, be performed under conditions having a saponifying action. Otherwise the presence of a catalyst is not absolutely required.

The conditions may be such that the carboxyl compounds containing carbonyl react only with a part of the hydroxyl groups of the polymeric compound; for instance a small proportion of the carboxyl compound may be used. In this case also both the polymeric compounds containing free hydroxyl groups and the saponifiable derivatives thereof may be used as parent materials.

The new acetal-like compounds are solid, amorphous products soluble in aqueous alkalies, for instance in solutions of NaOH, KOH, $K_2CO_3$, $Na_2CO_3$ or ammonia. They may be used as plastic masses of all kinds and are distinguished by the fact that they possess free carboxylic acid groups which are still reactive. In consequence thereof they may be applied in new fields where plastic masses have hitherto hardly been used. They have, for instance, the advantage that they may readily be colored fast tints. In comparsion with other polymerization products containing carboxylic acid groups they are distinguished by the fact that the content of carboxyl may be varied as desired; according to the quantity of aldehyde used there may be introduced any desired quantity of radicals containing carboxylic acid groups until all the hydroxyl groups originally contained in the parent material have been replaced.

The following examples serve to illustrate the invention, but they are not intended to limit it thereto, the parts being by weight:

1. 75 parts of glyoxylic acid are dissolved in 900 parts of a solution of 10 per cent. strength of polyvinyl alcohol in water. The solution is kept gently boiling for several hours. The originally clear and viscous solution begins to gelatinise after some time. The reaction may be accelerated by the addition of a small quantity of sulfuric acid or another inorganic acid. After the content of the vessel has become solid by cooling, 50 parts of sodium chloride or another coagulating agent are added to the mass. The polymeric acetal-carboxylic acid is precipitated in the form of a gritty (gravelly) mass which is filtered with suction, then washed with a salt solution of 3 per cent. strength and dried. A light powder is obtained which readily dissolves in hot water, especially after the addition of a small quantity of alkali. The powder has the properties of the known polymeric carboxylic acids; thus, in the form of the alkali compounds it yields highly viscous aqueous solutions, has a precipitating action on gelatin, has emulsifying properties and is suitable for dressing and sizing.

2. 75 parts of meta-benzaldehyde carboxylic acid are introduced into 750 parts of a suspension of 12 per cent. strength of polyvinyl alcohol in methanol and after the addition of 5 parts of concentrated hydrochloric acid the mass is kept boiling, while well stirring. After 2-3 hours the content of the vessel begins to become homogeneous. In most cases the reaction is complete after 5 minutes. By the introduction of steam into the now clear solution the solvent is distilled. The acetal carboxylic acid separates in the form of a whitish viscous mass and is dried after having been washed. A greyish-white powder is obtained which readily dissolves in aqueous alkali and behaves similarly to the product obtained as described in Example 1.

We claim:

1. The acetals of carbonyl compounds containing free carboxylic acid groups with compounds of the group consisting of polyvinyl alcohol and its derivatives containing free hydroxyl groups, said compounds being solid, amorphous, high molecular products soluble in alkalies.

2. The acetals of aldehydes containing free carboxylic acid groups with compounds of the group consisting of polyvinyl alcohol and its derivatives containing free hydroxyl groups, said compounds being solid, amorphous, high molecular products soluble in alkalies.

3. The acetals of aldehydes containing a free carboxylic acid group with polyvinyl alcohol, said compounds being solid, amorphous, high molecular products soluble in alkalies.

4. The acetals of glyoxylic acid with polyvinyl alcohol, said compounds being solid, amorphous, high molecular products soluble in alkalies.

5. The acetals of meta-benzaldehyde-carboxylic acid with polyvinyl alcohol, said compounds being solid, amorphous, high molecular products soluble in alkalies.

GEORG KRÄNZLEIN.
ULRICH LAMPERT.

DISCLAIMER 2,187,570.—*Georg Kränzlein* and *Ulrich Lampert*, Frankfort-on-the-Main-Hochst, Germany. POLYVINYL ACETALS. Patent dated January 16, 1940. Disclaimer filed November 12, 1941, by the assignee, *General Aniline & Film Corporation*.

Hereby enters this disclaimer to claims 1 to 3 of the above patent.

[*Official Gazette December 2, 1941.*]